United States Patent
Nakamura et al.

(10) Patent No.: US 7,069,774 B2
(45) Date of Patent: Jul. 4, 2006

(54) ENGINE CRANK ANGLE DETECTING DEVICE

(75) Inventors: Tomoji Nakamura, Shizuoka-ken (JP); Toshihiko Yamashita, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 63 days.

(21) Appl. No.: 10/476,927

(22) PCT Filed: Oct. 8, 2002

(86) PCT No.: PCT/JP02/10430

§ 371 (c)(1),
(2), (4) Date: Apr. 30, 2004

(87) PCT Pub. No.: WO03/036067

PCT Pub. Date: May 1, 2003

(65) Prior Publication Data

US 2004/0182142 A1     Sep. 23, 2004

(30) Foreign Application Priority Data

Oct. 19, 2001    (JP)    ............................... 2001-321616

(51) Int. Cl.
*G01M 15/00*    (2006.01)

(52) U.S. Cl. ..................................................... 73/117.3

(58) Field of Classification Search .................. 73/116, 73/117.2, 117.3, 118.1
See application file for complete search history.

(56) References Cited

U.S. PATENT DOCUMENTS

| 4,553,427 A | 11/1985 | Kuraoka et al. |
| 6,595,044 B1 * | 7/2003 | Namari ......................... 73/116 |
| 6,609,498 B1 * | 8/2003 | Mathews et al. ...... 123/406.62 |

* cited by examiner

*Primary Examiner*—Eric S. McCall
(74) *Attorney, Agent, or Firm*—Hogan & Hartson LLP

(57) ABSTRACT

A crank angle detecting device that is independent of fluctuations in engine rotational speed and reliably detects a reference crank angle position. A ring gear fixed to a crankshaft of a single cylinder engine has plural projections (teeth) formed around its outer periphery at equal intervals and one irregular interval portion (toothless portion). A crank angle sensor detects start and end on both sides of each projection, a lateral length of each projection and an interval of two adjacent projections, and calculates a ratio therebetween to distinguish the irregular interval portion from the projections. The crank angle sensor and the irregular interval portion are so positioned that the irregular interval portion is detected when the piston is close to bottom dead center.

20 Claims, 5 Drawing Sheets

(A)

Ratio between projection and recess = b/a = 20/10 = 2

(B)

Ratio between projection and recess = b/a = (20+10+20)/10 = 5

(A)

Ratio between projection and recess = b/a = 20/10 = 2

(B)

Ratio between projection and recess = b/a = (20+10+20)/10 = 5

ENGINE CRANK ANGLE DETECTING DEVICE

FIELD OF THE INVENTION

The invention relates to a crank angle detecting device for an engine, more specifically, a positioning arrangement for a crank angle sensor for detecting a reference position of a rotating crankshaft.

TECHNICAL BACKGROUND

In order to detect a crank angular position of the engine, a ring gear is fixed to the crankshaft, and has plural projections (teeth) formed at equal intervals as well as one toothless portion provided to have an irregular pitch to determine the reference position of the crankshaft. Determining the projections and recesses while the engine is rotating to identify the toothless portion, that is, a reference position by means of a ratio between the projections and the recesses allows detection of the crank angle. Fuel injection timing and ignition timing are controlled based on the detected crank angle.

In this case, when each tooth passes a crank angle sensor located facing an outer periphery of the ring gear due to the engine rotation, the crank angle sensor detects a lateral length of the tooth as well as an interval of the two adjacent teeth to calculate the ratio therebetween. This allows distinguishing of the teeth positioned at regular pitch from the toothless portion, thereby detecting the reference position.

However, since each tooth is detected when passing the crank angle sensor with the engine rotation, unstable engine speed may cause lower detection accuracy. A four-cycle engine makes two rotations to complete one cycle consisting of intake, compression, expansion and exhaust. In one cycle described above, the fluctuations in the engine speed repeat the increase in the expansion stroke, and then gradual decrease in the exhaust, intake and compression strokes. In particular, restarting the engine after it had a rest results in greater fluctuation in engine rotational speed.

A crank angular position is detected by detecting a projection (tooth's lateral length) and a recess (interval of the two adjacent teeth) of each tooth provided on the ring gear of the crankshaft, and by distinguishing the toothless portion based on the ratio therebetween. In this case, the ratio between the lateral lengths of tooth's projection and recess varies depending on the fluctuations in engine rotational speed, which may result in incorrect determination of the toothless portion, that is, a reference crank angle position. This requires adequate time for more reliable determination of the reference crank angle position.

An advantage of the present invention made in view of the prior art described above is to provide a crank angle detecting device for an engine independent of the fluctuations in engine rotational speed while performing more reliable detection of the reference crank angle position.

SUMMARY OF THE INVENTION

In order to achieve the above advantage, the present invention provides a crank angle detecting device for an engine, comprising a ring gear fixed to a crankshaft of a single cylinder engine, the ring gear having plural projections formed around its outer periphery at equal intervals as well as one irregular interval portion, and a crank angle sensor for detecting start and end on both sides of each projection formed on the ring gear, the crank angle sensor detecting a lateral length of each projection as well as an interval of the two adjacent projections, and calculating a ratio therebetween to distinguish the irregular interval portion from the projections, wherein the crank angle sensor and the irregular interval portion are so positioned that the irregular interval portion is detected when the piston in the engine is close to bottom dead center.

According to this arrangement, the irregular interval portion among the projections is detected when the piston is close to bottom dead center with the smaller fluctuations in engine rotational speed per one cycle. This provides improved reliability to detect the reference crank angle position.

In a preferable example of the arrangement, if a lateral length of the projection and an interval of the two adjacent projections are designated as (a) and (b), respectively, each projection is so provided that b/a (when a<b) or a/b (when a>b) is equal to 2 or greater.

According to the arrangement described above, the greater ratio between the projection and recess, the more enhanced accuracy in detecting each projection. In addition, the ratio between the projection and recess of a portion positioned at regular pitch differs significantly from that of the irregular interval portion. This allows improved accuracy in detecting the irregular interval portion even in the case of greater fluctuations in engine rotational speed. The ratio, b/a (when a<b) or a/b (when a>b), lower than 2 may cause lower accuracy in distinguishing between the projection and recess. However, an unnecessarily high ratio, b/a, or a/b may also cause lower projection detection accuracy. The values, (a) and (b), are therefore determined as appropriate depending on the ring gear size as well as the number of projections, and the sensor accuracy.

In order to achieve the above advantage, the present invention provides a crank angle detecting device for an engine, comprising a ring gear fixed to a crankshaft of a single cylinder engine, the ring gear having plural teeth as well as one toothless portion formed around its outer periphery at equal intervals, and a crank angle sensor for detecting the teeth formed on the ring gear, the crank angle sensor detecting a lateral length of each tooth as well as an interval of the two adjacent teeth, and calculating a ratio therebetween to distinguish the toothless portion from the teeth, wherein the crank angle sensor is so positioned that the toothless portion is detected when the piston in the engine is close to bottom dead center.

According to this arrangement, the toothless portion is detected when the piston is close to bottom dead center with the smaller fluctuations in engine rotational speed per one cycle. This provides improved reliability to detect the reference crank angle position.

A preferred example of the arrangement is characterized in that if tooth's lateral length and the interval of two adjacent teeth excluding the toothless portion are designated as (a) and (b) respectively, each tooth is so provided that b/a is equal to or greater than 2.

According to the arrangement described above, the greater ratio between the projection and recess of each tooth, the more enhanced accuracy in detecting each tooth. In addition, the ratio between the projection and recess of each tooth positioned at regular pitch differs significantly from that of the toothless portion. This allows improved accuracy in detecting the toothless portion even in the case of greater fluctuations in engine rotational speed. The ratio, b/a, lower than 2, may cause lower accuracy in distinguishing between the projection and recess of each tooth. However, an unnecessarily high ratio, b/a, may also cause lower teeth detection accuracy. The values, (a) and (b), are therefore determined as appropriate depending on the ring gear size as well as the number of teeth, and the sensor accuracy.

DETAILED DESCRIPTION OF THE PREFERRED EMBODIMENTS

An embodiment of the present invention will be described below with reference to the accompanying drawings.

Figure 1:
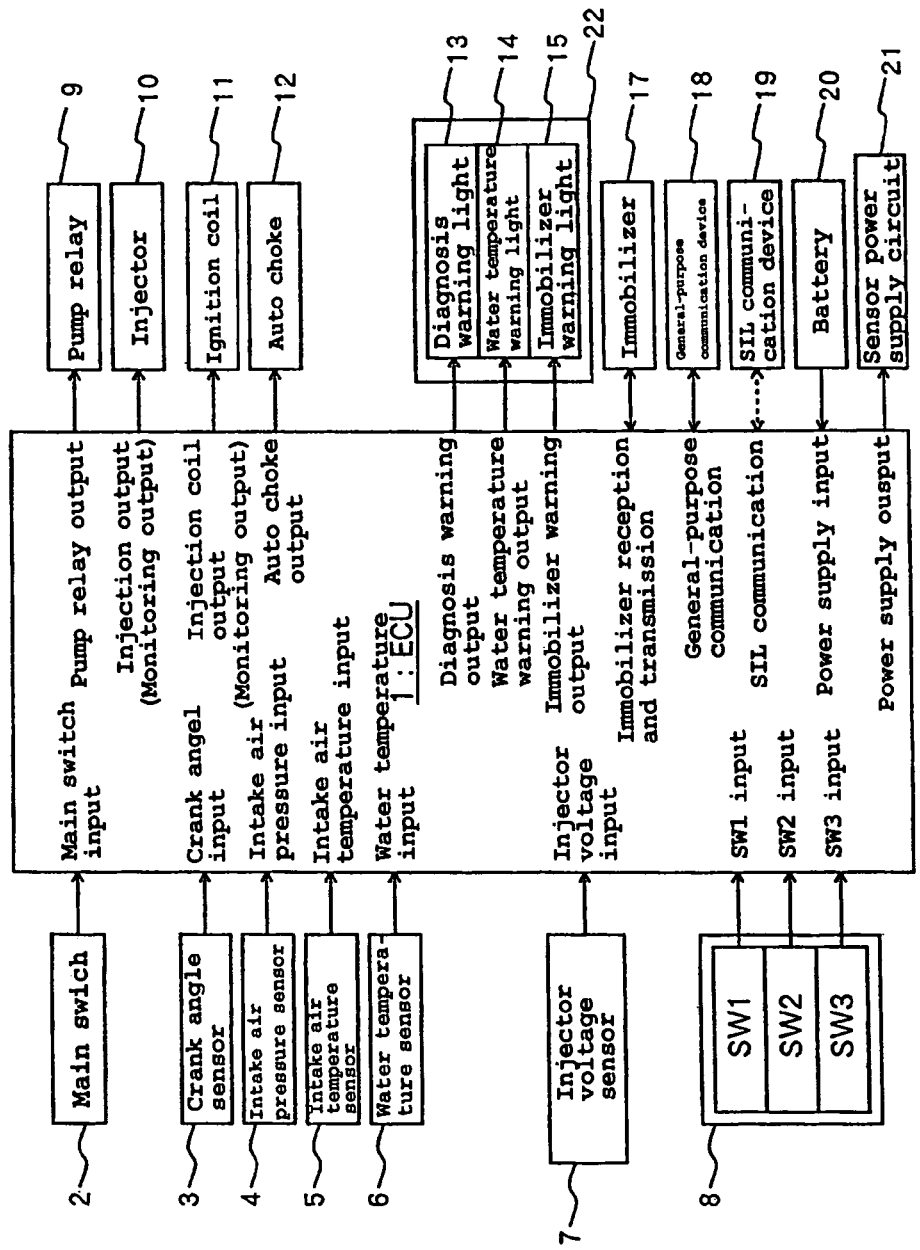
FIG. 1 is a block diagram of an entire control system of a motorcycle according to the present invention.

FIG. 1 is a block diagram of an entire control system of a motorcycle according to the embodiment of the present invention.

An engine control unit (ECU) 1 is unitized to be an integral component. A control circuit CPU (not shown) of the ECU 1 receives inputs including an on/off signal from a main switch 2, a crank pulse signal from a crank angle sensor 3, an intake air pressure detection signal from an intake air pressure sensor 4, an intake air temperature detection signal from an intake air temperature sensor 5, a cooling water temperature detection signal from a water temperature sensor 6, a voltage signal from an injector voltage sensor 7 for controlling an injector, and a checking input signal from a switch box 8 having a plurality of switches SW1 to SW3. The ECU 1 is also connected to a battery 20, from which battery power supply is inputted.

For outputs from the ECU 1, the ECU 1 outputs a pump relay output signal to a pump relay 9 for driving a fuel pump, an injector output signal for driving an electromagnetic coil of an injector 10, an ignition coil output signal for driving an ignition coil 11, an automatic choke output signal for driving an automatic choke 12 in response to cooling water temperature, a diagnosis warning signal for driving a diagnosis warning lamp 13 in a meter 22 when abnormality is detected, a water temperature warning signal for driving a water temperature warning lamp 14 to indicate a warning when the cooling water temperature exceeds a given temperature, and an immobilizer warning signal for driving an immobilizer warning lamp 15 when an immobilizer 17 of an engine key or the like is abnormally operated. Power supply voltage is outputted for supplying power to each sensor either through a sensor power supply circuit 21 or directly.

The ECU 1 is also connected to an external general purpose communication device 18 and capable of inputting/outputting control data or the like through a general purpose communication line. The ECU 1 is further connected to a serial communication device 19 and capable of handling serial communication.

Figure 2:
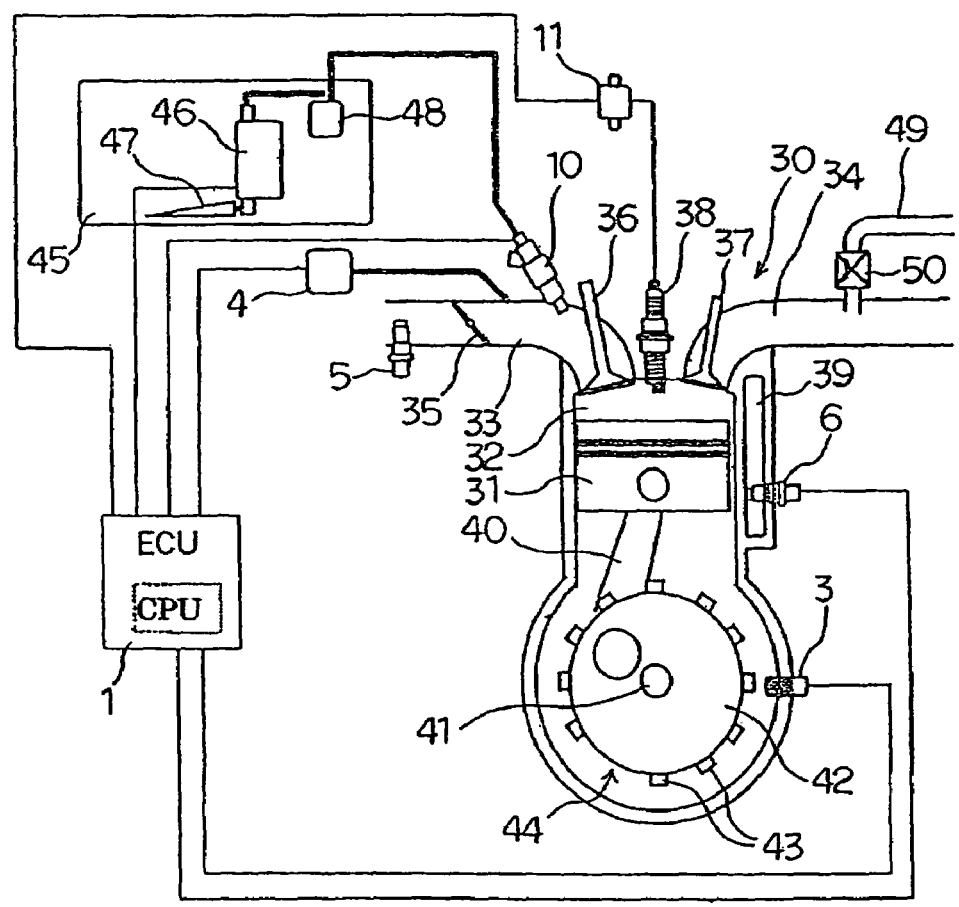
FIG. 2 is a schematic diagram of a crank angle detection apparatus for an engine according to the present invention.

FIG. 2 is a system structure diagram of a crank angle detection device according to the embodiment of the present invention.

A single-cylinder four-stroke engine 30 is formed with a combustion chamber 32 on top of a piston 31. An intake pipe 33 and an exhaust pipe 34 are connected to the combustion chamber 32 so as to communicate with the combustion chamber 32. A throttle valve 35 is provided in the intake pipe 33, and an intake valve 36 is disposed at an end thereof. An exhaust valve 37 is provided at an end of the exhaust pipe 34. A reference numeral 38 denotes an ignition plug. A cooling jacket 39 is provided around a cylinder of the engine 30, to which the water temperature sensor 6 is attached. The piston 31 is connected to a crankshaft 41 via a connecting rod 40.

A ring gear 42 is integrally secured to the crankshaft 41. The ring gear 42 has plural teeth (projections) 43 formed at equal intervals, among which one toothless portion (irregular interval portion) 44 is provided. The crank angle sensor (crank pulse sensor) 3 is provided for detecting the teeth 43 formed on the ring gear 42. The crank angle sensor 3 detects each tooth 43 to generate a pulse signal having a pulse width that corresponds to a lateral length on the upper side of the tooth. In this example, 12 portions to be each provided with the tooth 43 include one toothless portion 44 so that the sensor generates 11 (eleven) pulse signals one per 300 of one crank rotation.

The injector 10 is attached to the intake pipe 33. Fuel pumped from a fuel tank 45 through a filter 47 using a fuel pump 46 is delivered to the injector 10 under a constant fuel pressure maintained by a regulator 48. The ignition coil 11 controlled by the ECU 1 (FIG. 1) is connected to the ignition plug 38. The intake air pressure sensor 4 and the intake air temperature sensor 5 are attached to the intake pipe 33, which are separately connected to the ECU 1.

A secondary air introducing pipe 49 for cleaning exhaust gas is connected to the exhaust pipe 34. An air cut valve 50 is provided on the secondary air introducing pipe 49. The air cut valve 50 opens at high engine speed with the throttle opened during normal driving or acceleration to introduce secondary air, while closing at low engine speed with the throttle closed during deceleration to cut off the secondary air.

Figure 3:
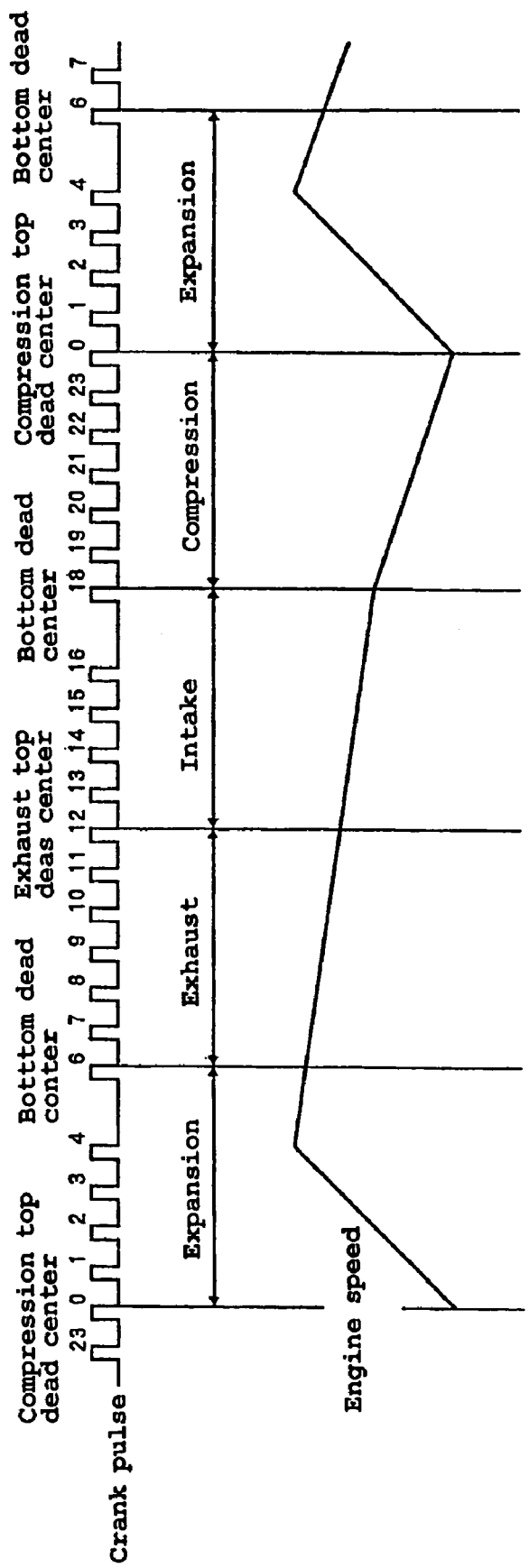
FIG. 3 is a graph showing fluctuations in engine rotational speed per cycle.

FIG. 3 is a graph showing fluctuations in engine rotational speed per cycle.

The greatest fluctuation in engine rotational speed is found in the vicinity of compression top dead center in the course of shifting from a compression stroke to an expansion stroke. In the present invention, as shown by crank pulse signals in the drawing, the toothless portion (pulseless portion) is provided to the position not in the vicinity of top dead center, but the vicinity of bottom dead center with smaller fluctuations in engine rotational speed. As described above, the crank angle sensor and the toothless portion formed on the ring gear are so positioned that the toothless portion can be detected in the vicinity of bottom dead center. This reduces the possibility of incorrect detection caused by the fluctuations in engine rotational speed.

Figure 4:
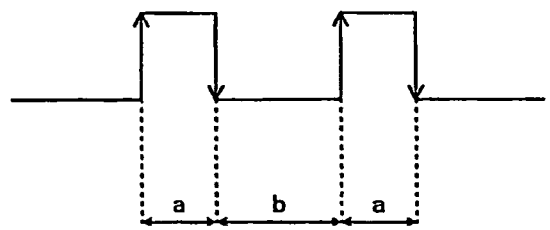
FIG. 4 is an explanatory view of teeth detecting method by the crank angle sensor of the present invention.
Figure 4:
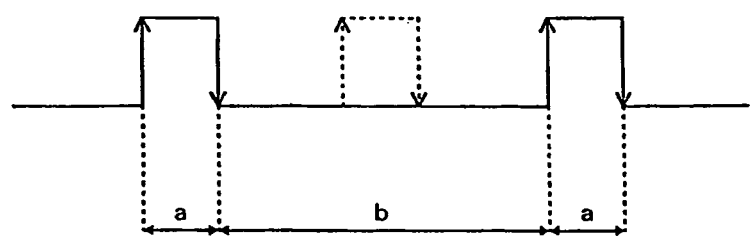

FIG. 4 is an explanatory view of teeth detecting method by the crank angle sensor, in which FIG. 4(A) shows a pulse signal for a tooth positioned at regular pitch, and FIG. 4(B) shows a pulse signal for one toothless portion. In the graph described above, the ring gear has the projection (tooth's lateral length) of 10° and the recess (intervals of the two adjacent teeth) of 20°.

As shown in FIG. 4(A), the ratio of the crank pulse between tooth's lateral length (a) and the interval (b) of the two adjacent teeth, b/a, becomes 2. Also as shown in FIG. 4(B), the toothless portion has the ratio, b/a, of 5 resulting from a greater interval (b) of the two adjacent teeth. Thus, presetting a threshold of the ratio, b/a, calculated in the ECU, at its mean value between 2 and 5 allows reliable identification of the toothless portion.

Figure 5:
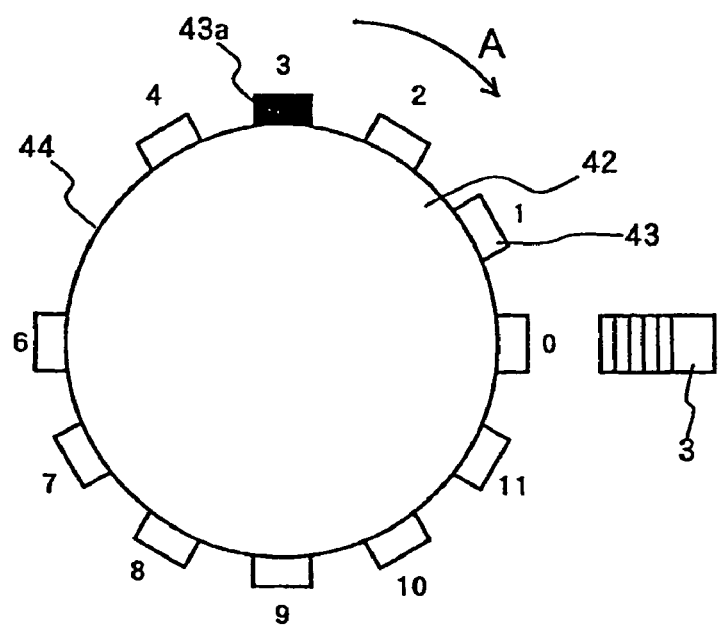
FIG. 5 is an explanatory view showing positioning at top dead center according to an embodiment of the present invention.

FIG. 5 is an explanatory view showing positioning of the ring gear and the crank angle sensor at top dead center.

The ring gear 42 has the 11 (eleven) teeth 43 as well as the toothless portion 44 formed at equal intervals of 30°. The tooth in the highest position when the piston is at top dead center is designated as a top dead center tooth 43a. The top dead center tooth 43a is the third closest tooth from the crank angle sensor 3. The toothless portion 44 corresponds to the fifth closest tooth therefrom. The ring gear 42 rotating in an arrow direction A provides crank pulse signals as shown in FIG. 3 described above. In this case, as shown in FIG. 3, a fifth signal in the first rotation and a 17th signal in the second rotation are missing as they correspond to the toothless portion, respectively.

Figure 6:
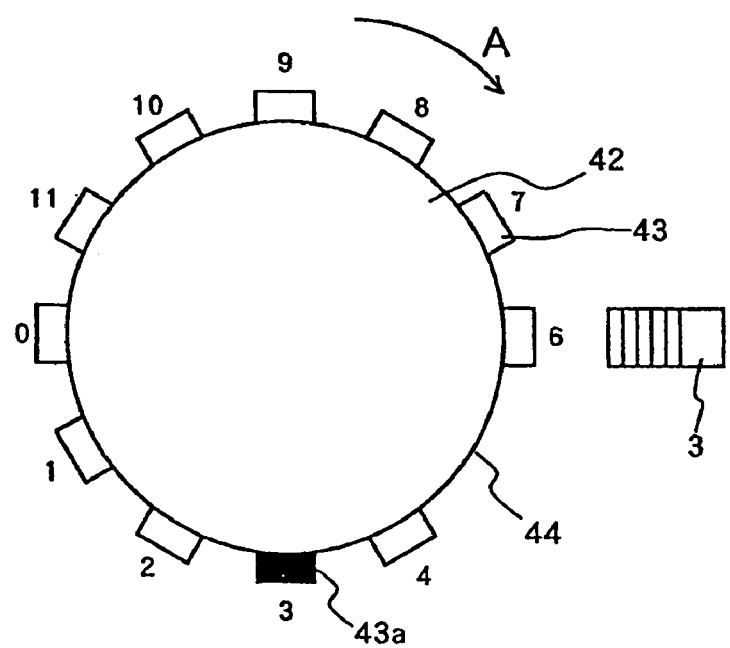
FIG. 6 is an explanatory view showing positioning at bottom dead center according to an embodiment of the present invention.

FIG. 6 is an explanatory view showing positioning of the ring gear and the crank angle sensor at bottom dead center.

As shown in the drawing, the top dead center tooth 43a passes a lowest position when the piston is at bottom dead center. At this point in time, the toothless portion 44 is positioned close to the crank angle sensor 3 (the example in the drawing shows a position of the toothless portion 44 that has just passed the crank angle sensor 3). As described above, in the present invention, the crank angle sensor 3 is so positioned that it can detect the toothless portion 44 when the piston is close to bottom dead center.

In the above embodiment, the descriptions have been made of a lateral length of the tooth (projection) shorter than the interval of the two adjacent teeth. However, the present invention may also be applicable to a lateral length of the tooth longer than the interval of the two adjacent teeth. In this case, if a lateral length of the projection and an interval of the two adjacent projections are designated as (a) and (b), respectively, each projection is so provided that a/b (when a>b) is equal to 2 or greater.

INDUSTRIAL USABILITY

As described above, in the present invention, the toothless portion is detected when the piston is close to bottom dead center with the smaller fluctuations in engine rotational speed per one cycle. This provides improved reliability to detect the reference crank angle position. In such a case, if tooth's lateral length and the interval of the two adjacent teeth excluding the toothless portion are designated as (a) and (b) respectively, each tooth is so provided that b/a is equal to or greater than 2. According to the arrangement described above, the greater ratio between the projection and recess of each tooth, the more enhanced accuracy in detecting each tooth. In addition, the ratio between the projection and recess of each tooth positioned at regular pitch differs significantly from that of the toothless portion. This allows improved accuracy in detecting the toothless portion even in the case of greater fluctuations in engine rotational speed.

The invention claimed is:

1. A crank angle detecting device for an engine, comprising:
    a ring gear fixed to a crankshaft of a single cylinder engine, the ring gear having a plurality of projections formed around an outer periphery at equal intervals as well as an irregular interval portion; and
    a crank angle sensor for detecting a start and an end on both sides of each of the plurality of projections formed on the ring gear, the crank angle sensor detecting a lateral length of each of the plurality of projections as well as an interval of two adjacent projections, and calculating a ratio therebetween to distinguish the irregular interval portion from the plurality of projections,
    wherein the crank angle sensor and the irregular interval portion are so positioned that the irregular interval portion is detected when a piston is close to a bottom dead center position.

2. The crank angle detection device for an engine according to claim 1, wherein if the lateral length of the plurality of projections and the interval of the two adjacent projections are designated as (a) and (b), respectively, each of the plurality of projections is so provided that b/a, when a<b, or a/b, when a>b, is equal to 2 or greater.

3. The crank angle detecting device for an engine according to claim 1, wherein the piston is connected to the crank shaft via a connecting rod.

4. The crank angle detecting device for an engine according to claim 1, wherein a combustion chamber is formed on top of the piston.

5. The crank angle detecting device for an engine according to claim 1, wherein the crank angle sensor generates a pulse signal having a pulse width.

6. The crank angle detecting device for an engine according to claim 5, wherein the pulse width corresponds to a lateral length on an upper side of each of the plurality of projections.

7. The crank angle detecting device for an engine according to claim 5, wherein a plurality of pulse signals are provided during a crank rotation.

8. A crank angle detecting device for an engine, comprising:
    a ring gear fixed to a crankshaft of a single cylinder engine, the ring gear having a plurality of teeth as well as a toothless portion formed around an outer periphery at equal intervals; and
    a crank angle sensor for detecting the plurality of teeth formed on the ring gear, the crank angle sensor detecting a lateral length of each of the plurality of teeth as well as an interval of two adjacent teeth and calculating a ratio therebetween to distinguish the toothless portion from the teeth,
    wherein the crank angle sensor and the toothless portion formed on the ring gear are so positioned that the toothless portion is detected when a piston is close to a bottom dead center position.

9. The crank angle detecting device for an engine according to claim 8, wherein if the lateral length of each of the plurality of teeth and the interval of the two adjacent teeth are designated as (a) and (b) respectively, each of the plurality of teeth is so provided that b/a is equal to or greater than 2.

10. The crank angle detecting device for an engine according to claim 8, wherein the piston is connected to the crank shaft via a connecting rod.

11. The crank angle detecting device for an engine according to claim 8, wherein a combustion chamber is formed on top of the piston.

12. The crank angle detecting device for an engine according to claim 8, wherein the crank angle sensor generates a pulse signal having a pulse width.

13. The crank angle detecting device for an engine according to claim 12, wherein the pulse width corresponds to a lateral length on an upper side of each of the plurality of teeth.

14. The crank angle detecting device for an engine according to claim 12, wherein a plurality of pulse signals are provided during a crank rotation.

15. A method for detecting a crank angle, comprising:
attaching a ring gear to a crank shaft of an engine with the ring gear having a plurality of projections formed around an outer periphery at equal intervals as well as an irregular interval portion;
detecting a start and an end on both sides of each of the plurality of projections formed on the ring gear;
detecting a lateral length of each of the plurality of projections and an interval of two adjacent projections, and calculating a ratio therebetween to distinguish the irregular interval portion from the plurality of projections; and
positioning a crank angle sensor and the irregular interval portion so that the irregular interval portion is detected when a piston is close to a bottom dead center position.

16. The method for detecting a crank angle according to claim 15, further comprising generating a pulse signal.

17. The method for detecting a crank angle according to claim 16, further comprising generating a pulse width for the pulse signal.

18. The method for detecting a crank angle according to claim 17, further comprising associating the pulse width to a lateral length on an upper side of each of the plurality of projections.

19. The method for detecting a crank angle according to claim 18, further comprising generating plurality of pulse signals during a crank rotation.

20. The method for detecting a crank angle according to claim 15, further comprising connecting the piston to the crank shaft via a connecting rod.

* * * * *